United States Patent [19]

Ljung

[11] 4,320,974
[45] Mar. 23, 1982

[54] PATHLENGTH CONTROLLER FOR A RING LASER CYROSCOPE

[75] Inventor: Bo H. G. Ljung, Wayne, N.J.

[73] Assignee: The Singer Company, Little Falls, N.J.

[21] Appl. No.: 164,195

[22] Filed: Jun. 30, 1980

[51] Int. Cl.³ .............................................. G01C 19/64
[52] U.S. Cl. ..................................................... 356/350
[58] Field of Search ................................. 356/350, 351

[56] References Cited
U.S. PATENT DOCUMENTS 4,219,276  8/1980  Dorsman .............................. 356/350

Primary Examiner—Vincent P. McGraw
Attorney, Agent, or Firm—Morris Liss; Thomas W. Kennedy

[57] ABSTRACT

Separate photodetectors and preamplifiers of prior art path controllers are replaced with an electronic circuit using the outputs of gyro fringe detectors. A ring laser gyro ordinarily includes fringe detectors for producing a data signal. Thus, the same detectors are used to serve two purposes. Pathlength controller simplification and cost reduction is thus realized since it is unnecessary to mount and align separate photodetectors to a gyro and to connect these photodetectors via flexible connections to a vibrating gyro.

10 Claims, 10 Drawing Figures

PATHLENGTH CONTROLLER FOR A RING LASER CYROSCOPE

FIELD OF THE INVENTION

The present invention relates to gyroscopes (gyros) and more specifically to a laser pathlength controller for a ring laser gyro.

BACKGROUND OF THE INVENTION

The purpose of a pathlength controller in a ring laser gyro is to maintain a constant pathlength. In order to do so, the laser intensity within the gyro is measured with one or two separate photodetectors, each having a corresponding preamplifier connected to its output. By demodulation of the signals from the separate photodetectors, synchronously with jitter imposed on a pathlength controlling piezoelectrically activated movable mirror, the laser can be tuned to the gain center of the laser intensity transition.

In the past, it has been necessary to mount and align the separate photodetectors when installed on a gyro. Further, special connecting leads, capable of flexing, have been necessarily employed to connect the photodetectors to a ring laser gyro undergoing vibration. Customarily, the photodetectors of the pathlength controller are equipped with filters or are otherwise specially manufactured to be insensitive to blue plasma light emitted by lasering gases in the gyro.

BRIEF DESCRIPTION OF THE PRESENT INVENTION

The contribution of the present invention is the replacement of the separate photodetectors and preamplifiers in a ring laser gyro path controller with an electronic circuit using the output of a fringe detector. This simplification makes it unnecessary to mount and align separate photodetectors and to connect such photodetectors with flexible connections to a ring laser gyro. Further, the mentioned filtering of plasma light becomes unnecessary. The net result is a simplification of the pathlength controller which reduces the cost of such a controller as well as increasing the inherent reliability of the controller, due to a reduction in the number of components. Maintenance is also reduced by virtue of the fact that alignment of separate photodetectors is not necessary with the invention.

The above-mentioned objects and advantages of the present invention will be more clearly understood when considered in conjunction with the accompanying drawings, in which:

DETAILED DESCRIPTION OF THE FIGURES

Figure 1:
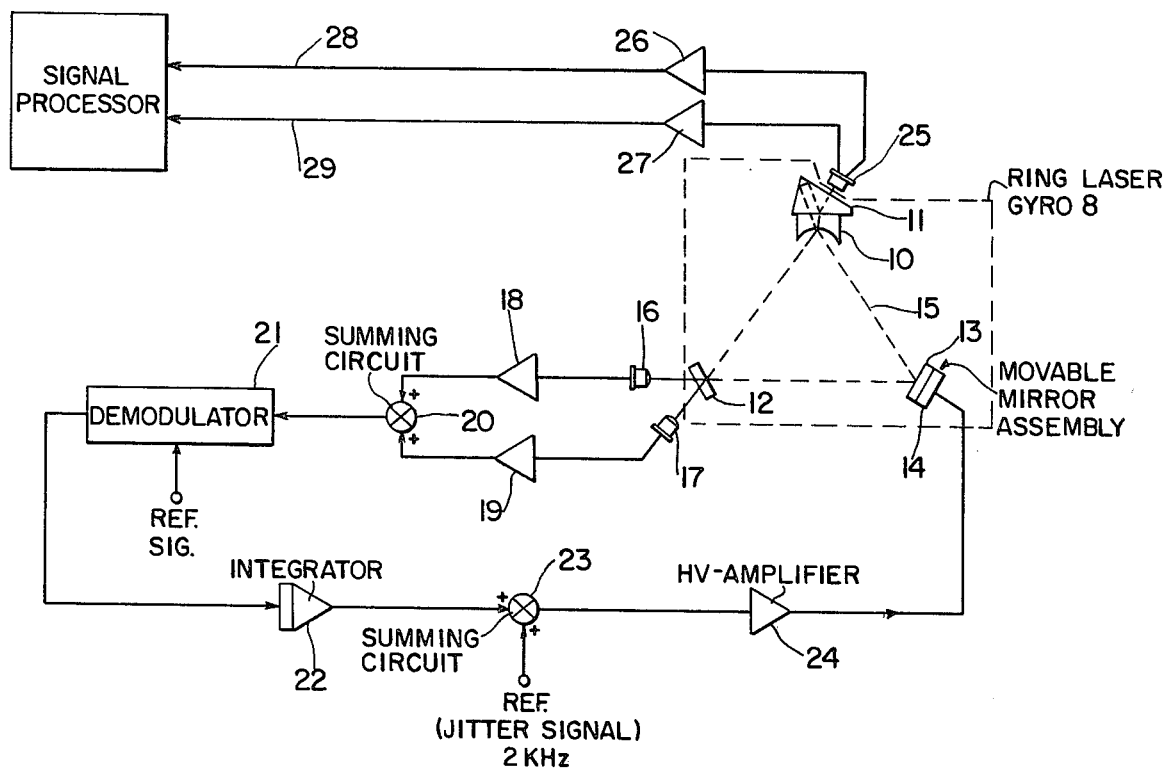
FIG. 1 is a schematic diagram illustrating the prior art pathlength controller utilizing separate photodetectors.

FIG. 1 illustrates a prior art pathlength controller employed in conjunction with a ring laser gyro. The gyro 8 is defined by conventional components including the spherical mirror 10 equipped with a beam combiner 11, flat mirror 12 and a pathlength controlling mirror 13. The latter mirror is mounted to a piezoelectric actuator 14. The combination of the mirror 13 and actuator 14 will hereinafter be referred to as a movable mirror assembly.

The laser beams, schematically illustrated by reference numeral 15, circulate clockwise and counterclockwise within a ring laser gyro. A certain amount of light from the circulating laser beams passes through mirror 12 and is measured by photodetectors 16 and 17. These are the photodetectors previously discussed as requiring filters or somehow specially manufactured to be insensitive to blue plasma light in the ring laser gyro. Further, these photodetectors must be precisely mounted to the ring laser gyro and aligned for proper detection.

The signals from the photodetectors 16 and 17 are respectively amplified in preamplifiers 18 and 19. The outputs from the preamplifiers are added in the summing circuit 20. Usually, the body of the ring laser gyro is dithered to prevent lock-in of the ring laser gyro. The dithering causes modulation of the signal obtained from the photodetectors 16 and 17. A demodulator 21, which may be in the nature of a synchronous rectifier, has a first input thereof connected to the output of the summing circuit 20. A second input to the demodulator 21 is a reference signal. A DC signal results at the output of the demodulator 21.

The resultant DC signal is next integrated in integrator 22 so that the signal-to-noise ratio at this point of the circuit is maximized. The integrated signal is then routed to the first input of a second summing circuit 23. A reference signal in the nature of a jitter signal, typically in the range of 2 KHz provides a second input to the summing circuit 23. The signal from the summing circuit 23 is amplified in a high voltage amplifier 24 and then routed to the input of the piezoelectric actuator 14.

The pathlength controller thus described is intended to generate a signal which will move the actuator 14 until the ring laser gyro 8 is tuned to its gain center. The intensity of the laser is thus maximized. In order to understand how the output signal of the gyro is used, continued reference is made to FIG. 1. The laser beams 15 exiting from the beam combiner 11 are detected by a dual photodetector 25. Signals from the photodetectors are amplified by respective AC coupled preamplifiers 26 and 27. The output leads 28 and 29 from preamplifiers 26 and 27, respectively, are connected to the input of a computer for processing gyro signal information. This signal processing does not, per se, form a part of the present invention.

Figure 2:
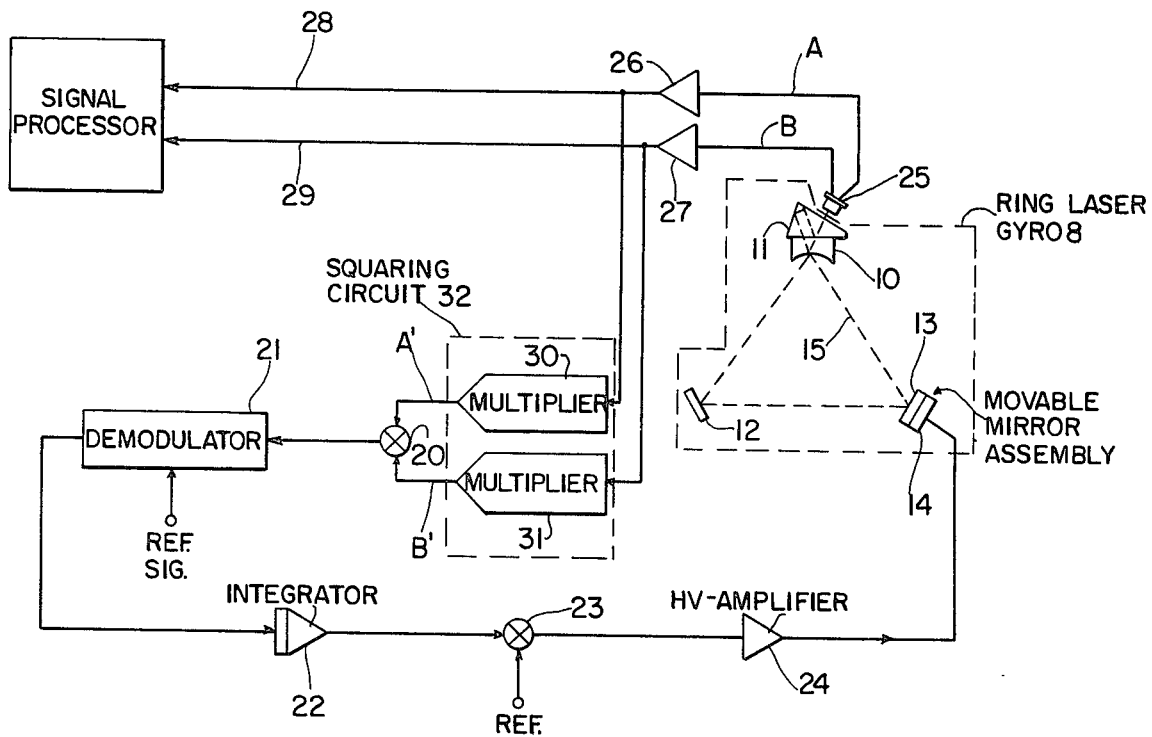
FIG. 2 is a schematic illustrating the simplified circuitry constituting the present inventive pathlength controller, without separate photodetectors.
Figure 5A:
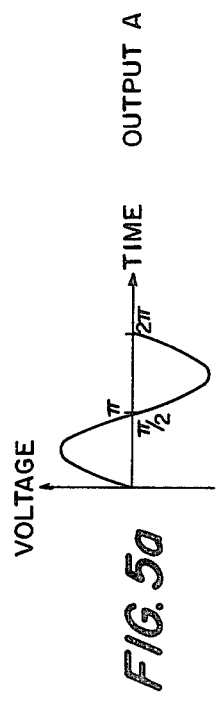
FIGS. 5a–5e are timing diagrams of signals present at various points of the circuitry shown in FIG. 2.
Figure 5B:
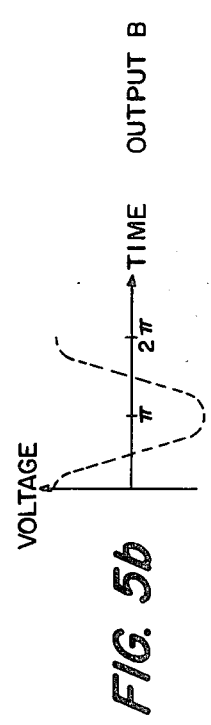
Figure 5C:
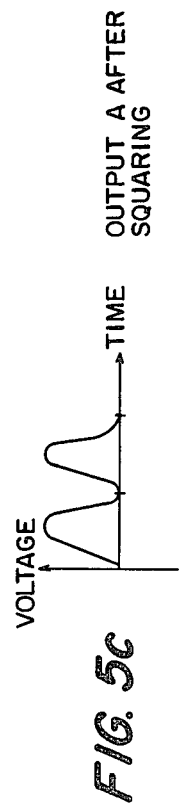
Figure 5D:
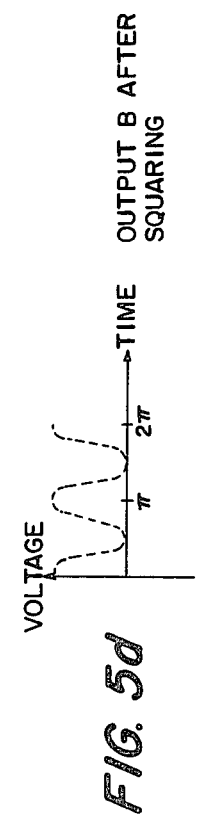
Figure 5E:
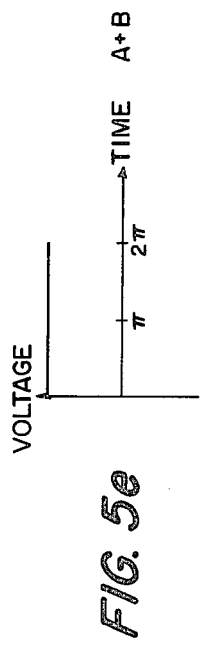

FIG. 2 shows a pathlength controller utilizing many of the components discussed in connection with the prior art controller of FIG. 1. For convenience, similar components employ the same reference numeral. From a review of FIG. 2, it will be apparent that the pathlength controller circuitry of the present invention does not utilize separate photodetectors 16 and 17 in order to obtain the pathlength controlling signals derived from these photodetectors as does the desired prior art approach. Rather, the output leads 28 and 29 from the fringe detector preamplifiers 26 and 27 are routed to two multipliers 30 and 31 (squaring circuit 32) where the AC components of the signals, fed to each multiplier circuit, are squared. It should be emphasized that the multipliers 30, 31, as well as the remaining circuits to be discussed in connection with FIG. 2 are separately conventional. It is not claimed that individual components form the present invention. Rather, it is the unique combination of these components replacing the photodetectors 16 and 17 and preamplifiers 18 and 19 of FIG. 1 which forms the invention.

As before, adding the signals in summing circuit 20 generates an input to the demodulator 21 which is an equivalent to the input of demodulator 21 of the prior art (FIG. 1). The output from the demodulator 21 in FIG. 2 is connected in a series circuit including integrator 22, second summing circuit 23 and high voltage amplifier 24, in a manner identical to that previously discussed in connection with the prior art of FIG. 1.

The following discussion is direction to an explanation of how the squaring circuit 32, in conjunction with the summing circuit 20 and demodulator 21 generates a response which is a substitute to that of the output from demodulator 21 of the prior art pathlength controller circuitry shown in FIG. 1.

Figure 3:
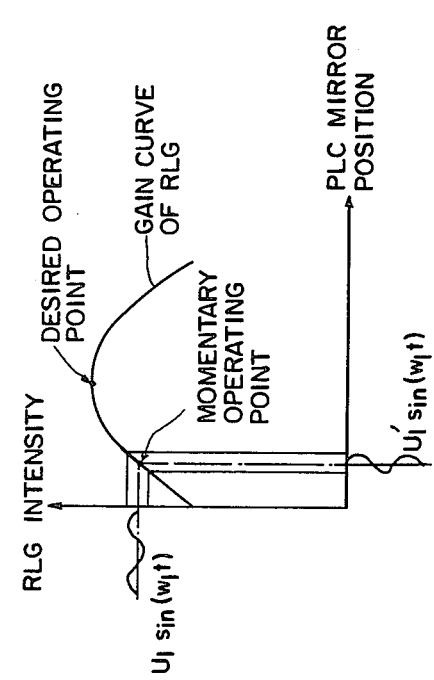
FIG. 3 is a plot of a transfer function illustrating the gain curve of a ring laser gyro provided with a pathlength controller.
Figure 4A:
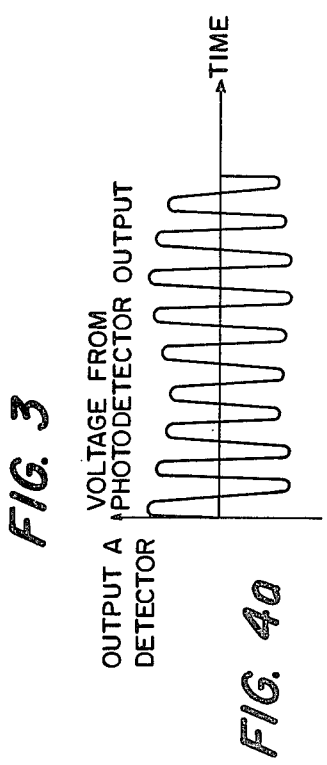
FIG. 4a is a plot of a modulated voltage signal from one output of a fringe detector utilized in the present invention.
Figure 4B:
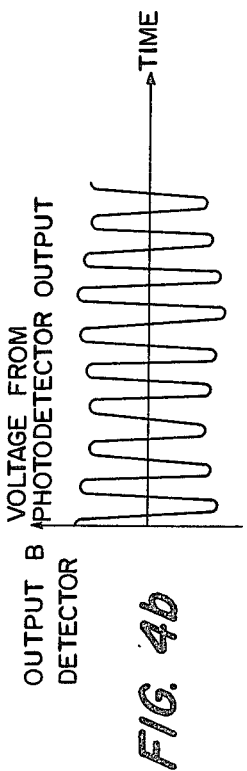
FIG. 4b is a plot of a modulated voltage signal from a second output of a fringe detector utilized in the present invention.

The function of the squaring circuit is explained by assuming, for the purpose of simplicity, that the gyro has a constant input velocity. The output beat frequency, $\omega$, of the gyro is then constant. However, this is not a necessary condition, but it simplifies the analysis. Further, assume that the gyro is not tuned. This also simplifies the analysis and is not a necessary condition. The pathlength controlling movable mirror 13 is vibrated with angular frequency $\omega_1$. The transfer function between the position of mirror 13 and ring laser gyro (RLG) intensity is depicted in FIG. 3. The beat frequency plots of the outputs at points A and B (FIG. 2) are illustrated in FIGS. 4a and 4b. Note from these figures that the two amplified output signals A and B from the dual photodetectors 25 are amplitude modulated by the jitter action of the pathlength controlling movable mirror 13. The two outputs can be expressed as:

$$A = U_1 \sin(\omega_1 t) \cdot \sin(\omega t) \quad \text{Eq. (1)}$$

$$B = U_1 \sin(\omega_1 t) \cdot \cos(\omega t) \quad \text{Eq. (2)}$$

where $\omega_1$ is the jitter frequency of mirror 13. Also note that Eqs. (1) and (2) represent a phase difference, at the beat frequency, of $\pi/2$ rad. The outputs A' and B' from the squaring circuit 32 are:

$$A' = \frac{U_1}{\sqrt{2}} \sin(\omega_1 t) \cdot [1 - \cos(2\omega t)] \quad \text{Eq. (3)}$$

$$B' = \frac{U_1}{\sqrt{2}} \sin(\omega_1 t) \cdot [1 + \cos(2\omega t)] \quad \text{Eq. (4)}$$

(See *Analog Devices Non-Linear Circuits Handbook*, January, 1976, p. 502), published by Analog Devices, Inc. The sum of A' and B' is:

$$A' + B' = \sqrt{2} \cdot U_1 \cdot \sin(\omega_1 t) \quad \text{Eq. (5)}$$

Note that the beat frequency $\omega$ is absent in Eq. (5). Also note that the output A'+B' has no double frequency component.

The absence of the beat frequency $\omega$ in the sum of the squares can be illustrated graphically in FIGS. 5a-5e. In these figures the first complete beat frequency cycle (absent mirror jitter modulation) is illustrated. The demodulator 21 demodulates the jitter component. The output signal A'+B' present at the input of demodulator 21 in FIG. 2 is a replacement of the input to demodulator 21 in the prior art circuit of FIG. 1.

Accordingly, the invention presents the novel approach of squaring the dual output from dual photodetectors 25 and then adding the squared signals for a resultant signal which is the equivalent of a pathlength controller signal of a more complex prior art circuit.

It should be understood that the invention is not limited to the exact details of construction shown and described herein for obvious modifications will occur to persons skilled in the art.

I claim:

1. In a ring laser gyroscope having a pathlength controlling movable mirror assembly and a fringe detector with dual output signals produced therefrom, the improvement comprising:
    means connected at the input thereof to the detector output signals for squaring each signal separately;
    summing means connected at the input thereof to each squared signal for producing a new signal including the summation of squared output signals from the detector; and
    means connected between the output of the summing means and the movable mirror assembly for maximizing laser intensity in the gyroscope.

2. The subject matter set forth in claim 1 together with means connected between the summing means and intensity maximizing means for demodulating a modulation component superimposed on the signal from the output of the summing means.

3. The subject matter set forth in claim 1 together with preamplifier means connected between the outputs of the detector and the inputs of the squaring means for amplifying the detector output signals.

4. The subject matter set forth in claim 1 wherein the means connected between the output of the summing means and the movable mirror assembly include means for integrating the signal from said summing means.

5. The subject matter of claim 4 together with second summing means connected to the output of the integrating means for adding a jitter signal to the integrated signal.

6. The subject matter set forth in claim 5 together with a high voltage amplifier connected in circuit between the output of the second summing means and the movable mirror assembly for increasing the voltage for operating the mirror.

7. A ring laser gyroscope pathlength control system comprising:
    a fringe detector with at least dual output signals produced therefrom for detecting the intensity of lasing in a gyroscope;
    a pathlength controlling movable mirror assembly for reflecting laser light from the surface thereof;

means connected at the input thereof to the detector output for squaring each detector output signal separately;

preamplifier means connected between the outputs of the detector and the inputs of the squaring means for amplifying the detector output signals;

summing means connected at the input thereof to each squared signal for producing a new signal including the summation of squared output signals from the detector;

means connected at its input to the output of the summing means for demodulating a modulation component superimposed on the signal from the output of the summing means;

means connected between the output of the demodulating means and the movable mirror assembly for integrating the signal from the demodulating means;

second summing means connected in series with the output of the integrating means for adding a jitter signal to the integrated signal; and a high voltage amplifier connected in series with the output of the second summing means and the movable mirror assembly for increasing the voltage for operating the mirror.

8. A method for controlling the pathlength of a laser beam in a ring laser gyroscope equipped with a fringe detector with at least dual output signals produced therefrom and a pathlength controlling movable mirror, the method comprising the steps of:

squaring each detector output signal;

summing the squared output signals;

connecting the summed signals to the movable mirror for maximizing laser intensity in the gyroscope.

9. The subject matter of claim 8 together with the steps of:

demodulating a modulation component superimposed on the summed signal; and integrating the signal after demodulation.

10. The subject matter set forth in claim 9 together with the step of superimposing a reference jitter signal on the integrated signal.

* * * * *